US010350974B2

(12) United States Patent
Nagaishi et al.

(10) Patent No.: US 10,350,974 B2
(45) Date of Patent: Jul. 16, 2019

(54) VEHICLE DOOR STRUCTURE

(71) Applicant: Nissan Motor Co., Ltd., Yokohama-shi, Kanagawa (JP)

(72) Inventors: Yusuke Nagaishi, Kanagawa (JP); Yukihiro Hamada, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/567,985

(22) PCT Filed: May 27, 2015

(86) PCT No.: PCT/JP2015/065285
§ 371 (c)(1),
(2) Date: Oct. 20, 2017

(87) PCT Pub. No.: WO2016/189705
PCT Pub. Date: Dec. 1, 2016

(65) Prior Publication Data
US 2018/0134130 A1     May 17, 2018

(51) Int. Cl.
*B60J 5/04* (2006.01)
*B32B 5/02* (2006.01)
*B32B 27/08* (2006.01)

(52) U.S. Cl.
CPC ............ *B60J 5/0456* (2013.01); *B32B 5/024* (2013.01); *B32B 27/08* (2013.01); *B60J 5/045* (2013.01); *B60J 5/0413* (2013.01); *B60J 5/0415* (2013.01); *B60J 5/0429* (2013.01); *B60J 5/0461* (2013.01); *B60J 5/0468* (2013.01); *B60J 5/0481* (2013.01); *B32B 2605/08* (2013.01)

(58) Field of Classification Search
CPC ........ B60J 5/0456; B60J 5/0468; B60J 5/045; B60J 5/0415; B60J 5/0461; B60J 5/0429; B60J 5/043; B60J 5/0441
See application file for complete search history.

(56) References Cited

U.S. PATENT DOCUMENTS

| 9,950,594 | B1 * | 4/2018 | Akhlaque-E-Rasul ..................... B60J 5/0441 |
| 2007/0220812 | A1 * | 9/2007 | Valentage .............. B60J 5/0416 49/502 |
| 2013/0074413 | A1 * | 3/2013 | Moriya ................. B60J 5/0425 49/394 |

FOREIGN PATENT DOCUMENTS

| DE | 102012208670 A1 * | 12/2012 | ............ B60J 5/0415 |
| DE | 10 2012 019 283 A1 | 3/2013 | |
| FR | 2941892 A1 * | 8/2010 | ............ B29C 70/72 |
| GB | 2 238 989 A | 6/1991 | |
| JP | 4-4893 Y2 | 2/1992 | |
| JP | 9-21253 A | 1/1997 | |
| JP | 2004-345500 A | 12/2004 | |
| JP | 2006-224876 A | 8/2006 | |
| JP | 2007-313973 A | 12/2007 | |
| JP | 2007313973 A * | 12/2007 | ............ B62D 29/02 |
| WO | 2007/111787 A1 | 10/2007 | |

* cited by examiner

*Primary Examiner* — Marcus Menezes
(74) *Attorney, Agent, or Firm* — Global IP Counselors, LLP (57) ABSTRACT

A vehicle door structure includes an outer door panel made of resin, etc. The outer door panel has an attenuated portion. The attenuated portion is provided along a boundary line that divides the outer door panel into at least a first region that includes the outer door handle and other regions.

14 Claims, 6 Drawing Sheets

VEHICLE DOOR STRUCTURE

CROSS-REFERENCE TO RELATED APPLICATIONS

This application is a U.S. National stage application of International Application No. PCT/JP2015/065285, filed May 27, 2015.

BACKGROUND

Field of the Invention

The present invention relates to a vehicle door structure.

Background Information

It is desirable for an outer door panel and an inner door panel of a vehicle door to be bonded such that the two panels will not separate even when the door is deformed due to a side collision. Japanese Laid-Open Patent Application No. 2004-345500 (Patent Document 1) discloses a door structure in which a peripheral portion of an inner panel and a peripheral portion of an outer panel that is subjected to hemming work so as to be folded over on the rear surface thereof are friction stir welded and bonded so as to be inseparable.

SUMMARY

However, if the outer door panel is made of resin or fiber-reinforced resin (which can hereinafter be collectively referred to as made of resin, etc.), the aforementioned hemming work and welding cannot be applied, and it is not easy reliably to prevent separation of the door panels at the time of a side collision. In addition, compared with an outer door panel made of panel, an outer door panel made of resin, etc., tends to generate cracks due to collision load at the time of a side collision, but it is difficult to predict with accuracy the location of said generated cracks.

Depending on how the above-described door panel is separated or cracked, there is the risk that the region around the outer door handle of the outer door panel is dragged and moved by deformation of the entire panel, and that the wire for operating the door lock device connected to the outer door handle is moved in an unintended direction.

An object of the present invention is to prevent movement of the above-described wire in an unintended direction at the time of a side collision, in a vehicle door equipped with an outer door panel made of resin, etc.

One embodiment of the present invention is a vehicle door structure in which an attenuated portion is provided to an outer door panel made of resin, etc. The attenuated portion is provided along a boundary line that divides the outer door panel into a region that includes the outer door handle and other regions.

According to this door structure, since an attenuated portion is provided along a boundary line that divides the outer door panel into a region that includes the outer door handle and other regions, if a crack occurs in the outer door panel at the time of a side collision, the crack is made to occur along the boundary line, and it becomes easier to cause the region that includes the outer door handle to separate from the other regions. Thus, since it is possible to prevent the region that includes the outer door handle from being dragged and moved by deformation of the entire panel, it becomes possible to prevent movement of the wire in an unintended direction.

BRIEF DESCRIPTION OF THE DRAWINGS

Referring now to the drawings, a vehicle door structure is illustrated.

DETAILED DESCRIPTION OF THE EMBODIMENTS

Embodiments of the present invention will be described below with reference to the drawings.

First Embodiment

Figure 1A:
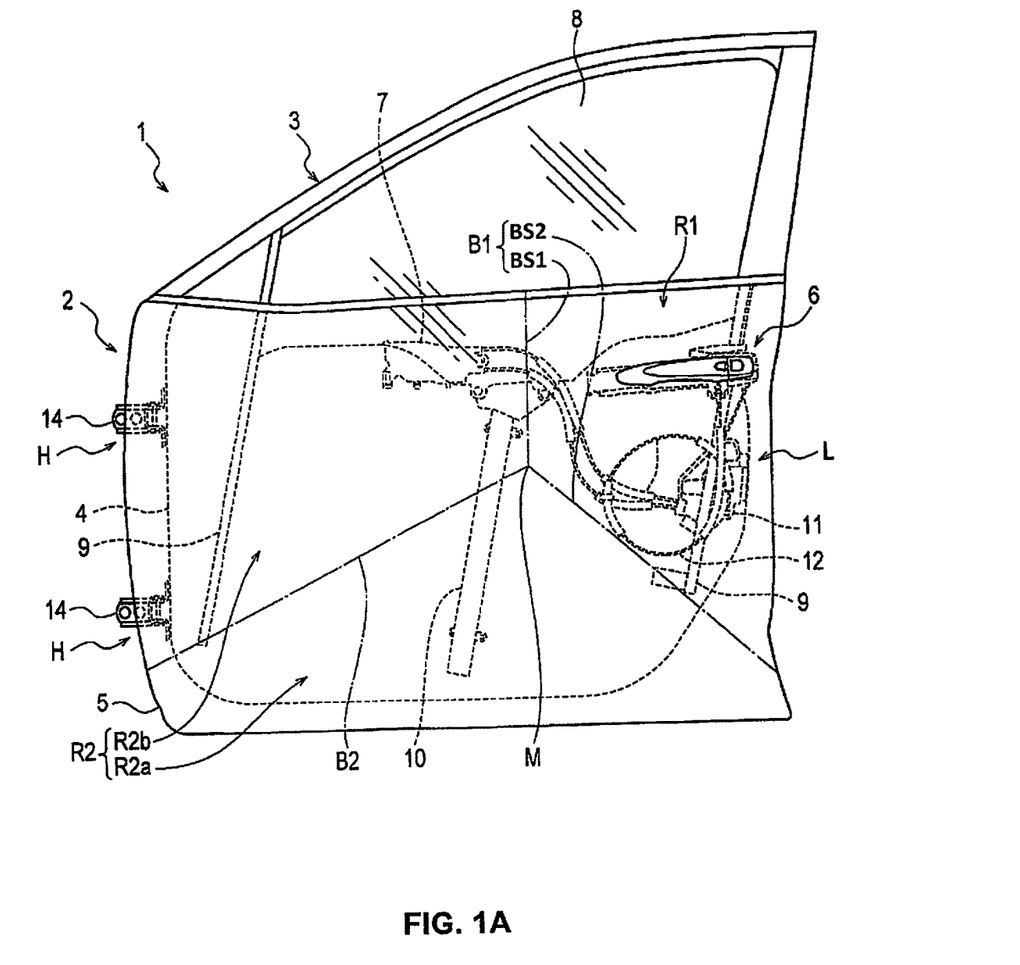
FIG. 1A is an outside view illustrating a door having the vehicle door structure according to the first embodiment of the present invention.
Figure 1B:
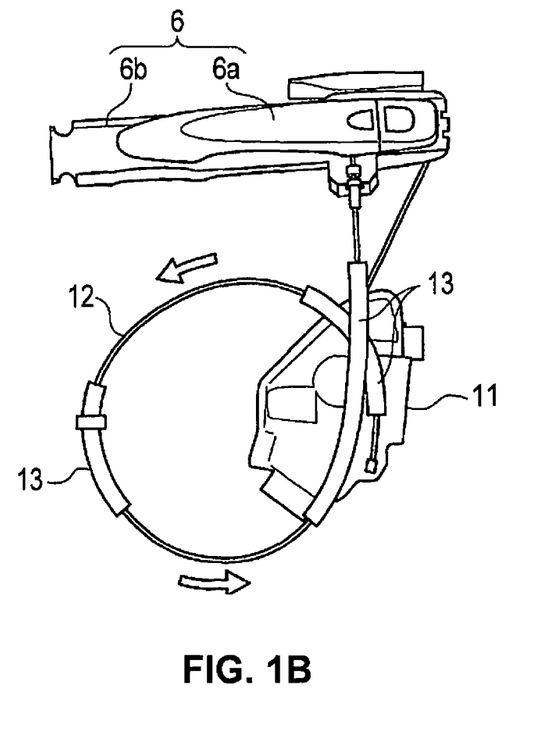
FIG. 1B is a view illustrating the positional relationship between an outer door handle, a door lock device and a wire for use in a door lock operation.
Figure 2A:
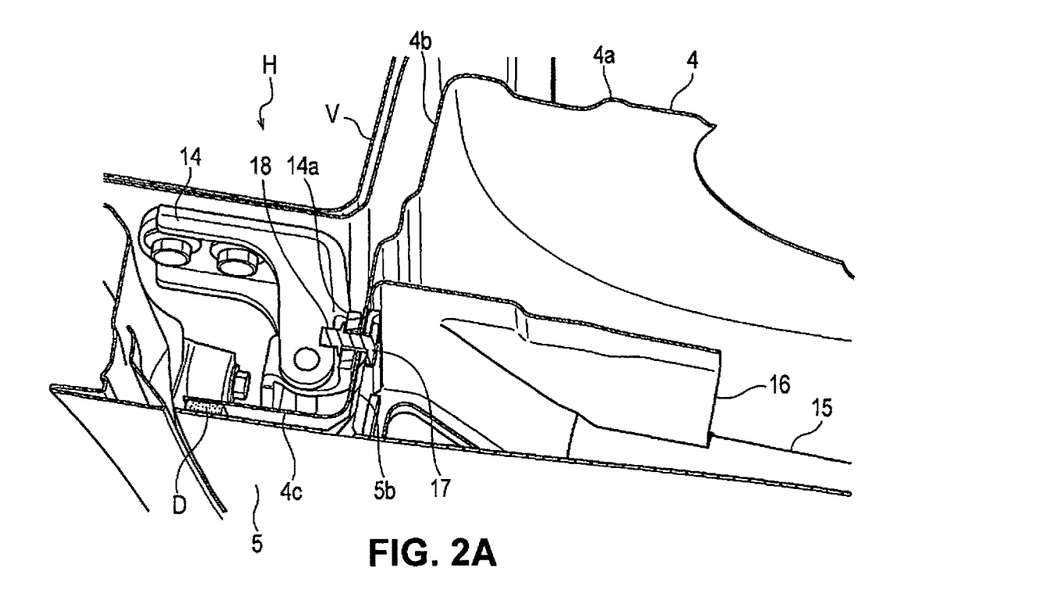
FIG. 2A is a cross-sectional perspective view illustrating a structure of a hinge attachment portion of the door in FIG. 1.
Figure 2B:
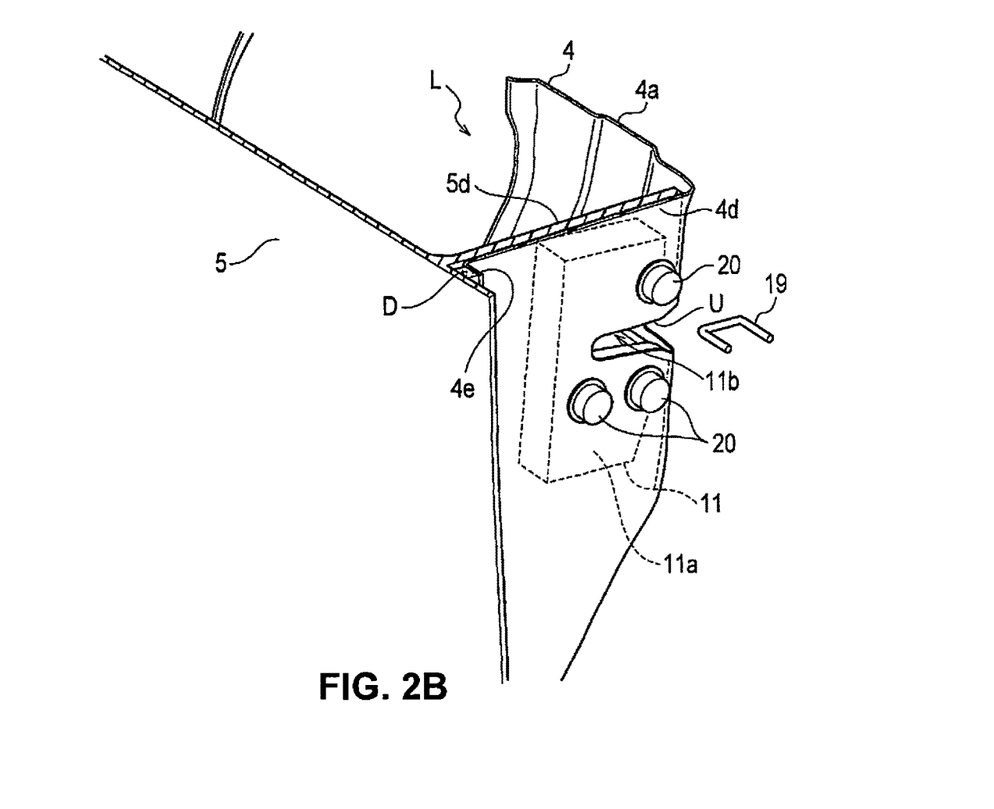
FIG. 2B is a cross-sectional perspective view of a structure of a lock attachment portion of the door in FIG. 1.

FIG. 1 illustrates a door 1 comprising the door structure according to the first embodiment of the present invention. FIG. 2 illustrates the structures of the hinge attachment portion H at the front end portion of the door 1 and of the lock attachment portion L at the rear end portion of the door 1.

The door 1 comprises a door main body 2 and a door sash 3. The door main body 2 is configured from an inner door panel 4 made from a steel plate, and an outer door panel 5 made of fiber-reinforced resin, which constitutes the outer surface of the door 1.

In a front view of the door as viewed from the side surface direction of the vehicle, an outer door handle 6 is attached to the rear upper portion of the outer door panel 5, as illustrated in FIG. 1A. A door inner handle 7 is provided to the inner door panel 4. A window glass elevating device 10, and the like, for raising and lowering window glass 8 along a guide rail 9 is provided between the inner door panel 4 and the outer door panel 5.

A wire 12 is connected to the outer door handle 6 for operating a door lock device 11 (lock device), as illustrated in FIG. 1B. The wire 12 is inserted into a plurality of tubular guide members 13 that are fixed on the rear surface of the outer door panel 5. The wire 12 is configured to unlock the door lock device 11 by being moved inside the guide members 13 in the unlocking direction (direction of the arrow in FIG. 1B) when an operator turns a handle portion 6a of the outer door handle 6 with respect to a handle base 6b.

The front end portion of the door 1 is supported by the vehicle body V in an openable and closable manner via two upper and lower door hinges 14 that are fixed to the vehicle body V, as illustrated in FIG. 1A and FIG. 2A. The door hinges 14 are directly fixed to both the inner door panel 4 and the outer door panel 5.

The front end portion of the inner door panel 4 is provided with a front vertical wall portion 4b that extends from a front edge of a cabin side wall portion 4a of the inner door panel 4 toward the outer door panel 5, and a front flange portion 4c that extends forward from an outer edge of the front vertical wall portion 4b, as illustrated in FIG. 2A. On the other hand, a front vertical wall portion 5b (hinge attachment flange) that is erected on a side surface of the outer door panel 5 on the inner door panel 4 side and that extends toward the inner door panel 4 is integrally formed in the front end portion of the outer door panel 5. A front end portion of a reinforcement 16 connected to a guard bar 15 is joined to a rear side surface of the front vertical wall portion 4b.

In the present embodiment, the front edge portion of the front flange portion 4c of the inner door panel 4 and the front end portion of the outer door panel 5 are joined to each other via well-known structural adhesives D, such as epoxy type or urethane type adhesives. In addition, the front vertical wall portion 5b of the outer door panel 5 is fastened to a door side member 14a (door hinge member) of the door hinge 14 by a fastening member such as a bolt 17, in a state of being overlapped with the front vertical wall portion 4b of the inner door panel 4. The bolt 17 is passed through the two front vertical wall portions 4b, 5b, and threaded to a nut 18.

A door lock device 11 is provided in the rear end portion of the door 1, as illustrated in FIG. 1A and FIG. 2B. The door lock device 11 maintains the door 1 in a closed state by being engaged with a striker 19 that is fixed to the vehicle body V. The door lock device 11 is directly fixed to both the inner door panel 4 and the outer door panel 5.

The rear end portion of the inner door panel 4 is provided with a rear vertical wall portion 4d that extends from a rear edge of the cabin side wall portion 4a of the inner door panel 4 towards the outer door panel 5, and a rear flange portion 4e that extends rearward from an outer edge of the rear vertical wall portion 4d, as illustrated in FIG. 2B. On the other hand, a rear vertical wall portion 5d (lock attachment flange) that is erected on the side surface of the outer door panel 5 on the inner door panel 4 side and that extends toward the inner door panel 4 is integrally formed in the rear end portion of the outer door panel 5.

In the present embodiment, the rear edge portion of the rear flange portion 4e of the inner door panel 4 and the rear end portion of the outer door panel 5 are joined to each other via the adhesive D. Additionally, the rear vertical wall portion 5d of the outer door panel 5 is fastened to the door lock device 11 by a fastening member such as a bolt 20, in a state of being overlapped with the rear vertical wall portion 4d of the inner door panel 4. The bolt 20 is passed through the two rear vertical wall portions 4d, 5d, and threaded into a screw hole provided on a base 11a of the door lock device 11. A U-shaped opening U for inserting the striker 19 into a lock mechanism 11b of the door lock device 11 when closing the door 1 is formed in the two rear vertical wall portions 4d, 5d.

In a front view of the door (FIG. 1A), the outer door panel 5 is divided into an outer door handle 6 peripheral region R1 (first region), and the other, front side region R2 (second region) by a first boundary line B1. The first boundary line B1 takes on a broken line shape, comprising a first straight line segment BS1 and a second straight line segment BS2 connected to a lower end point thereof. The first straight line segment BS1 is positioned on the front side of the front end of the outer door handle 6 and on the rear side of a center line of the outer door panel 5 in the longitudinal direction of the vehicle, and extends in the vertical direction. The second straight line segment BS2 extends rearward and obliquely downward from the lower end point of the first straight line segment BS1. Hereinafter, the two straight line segments BS1, BS2 may be collectively referred to as the first boundary line B1.

In addition to the door lock device 6, the door lock device 11 and the wire 12 are disposed on the inner side of the outer door handle peripheral region R1 in a front view of the door. The door lock device 11 and the wire 12 are directly or indirectly supported in or fixed to the outer door handle peripheral region R1. Specifically, the rear vertical wall portion 5d (lock attachment flange) of the outer door panel 5 to which the door lock device 11 is fastened is erected on the side surface within the outer door handle peripheral region R1 on the inner door panel 4 side. In addition, the portion of the rear vertical wall portion 5d to which the door lock device 11 is fastened is also positioned on the inner side of the outer door handle peripheral region R1 in a front view of the door. That is, the door lock device 11 is fixed to the outer door handle peripheral region R1 via the rear vertical wall portion 5d. Additionally, the guide member 13 in which the wire 12 is inserted is fixed to the rear surface of the outer door handle peripheral region R1. That is, the wire 12 is supported in the outer door handle peripheral region R1 so as to be movable in the axial direction via the guide member 13.

In addition, the front side region R2 is divided into a front lower side region R2a and a front upper side region R2b by a linear second boundary line B2 that extends forward and obliquely downward from an intersection M of the first straight line segment BS1 and the second straight line segment BS2 on the first boundary line B1.

The outer door panel 5 is provided with a first attenuated portion F1, described below, along the first straight line segment BS1 and the second straight line segment BS2. The portion of the first attenuated portion F1 along the first straight line segment BS1 extends from the intersection M to the upper side peripheral portion of the outer door panel 5, and the portion along the second straight line segment BS2 extends continuously from the intersection M to the rear side peripheral portion of the outer door panel 5.

Additionally, the outer door panel 5 is provided with a second attenuated portion F2, described below, along the second boundary line B2. The second attenuated portion F2 is connected to the first attenuated portion F1 at the intersection M and extends continuously from the intersection M to the lower end portion of the front side peripheral portion of the outer door panel 5.

Figure 3A:
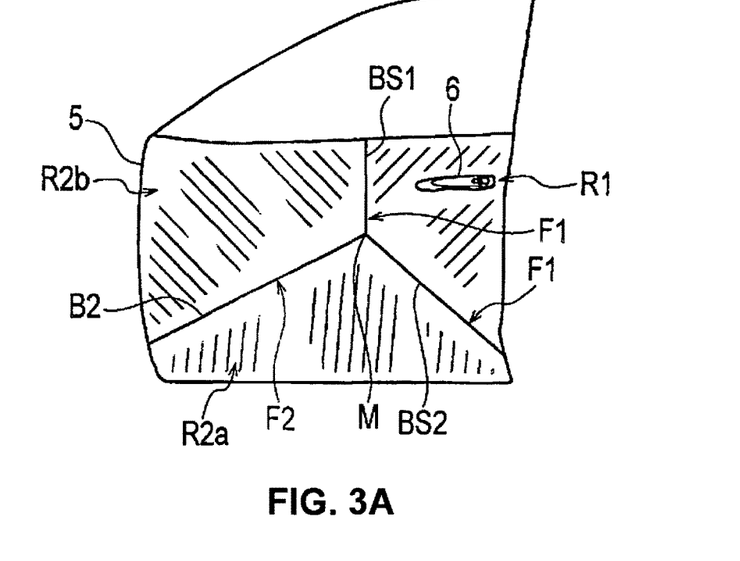
FIG. 3A is an outside view illustrating an outer door panel according to a first embodiment.

The outer door panel 5 is configured from a composite material laminate, obtained by laminating a plurality of fiber-reinforced resin sheets, and pressurizing and curing same. Specifically, the laminate is obtained by, for example, laminating prepreg sheets, in which continuous carbon fibers aligned in one direction are impregnated with thermosetting resin, such that the reinforcing fibers of each layer intersect each other equiangularly, and is then molded via the application of heat and pressure. The fiber-reinforced resin sheet that constitutes the outer door panel 5 is quasi-isotropic at each of the three regions R1, R2a, R2b, but the laminated structures (number of layers, lamination order, orientation direction, etc.) of the fiber-reinforced resin sheets in the regions are different from each other, as illustrated in FIG. 3A.

The first attenuated portion F1 of the present embodiment is a stepped strength portion, in which the strengths thereof (tensile strength, compressive strength, bending strength, etc.) are varied between a side adjacent the front side region R2 and a side adjacent the outer door handle peripheral region R1 of the first boundary line B1, by changing the laminated structure of the fiber-reinforced resin that constitutes the outer door panel 5. Additionally, the second attenuated portion F2 is a stepped strength portion, in which the strength of the fiber-reinforced resin is varied between a side adjacent the front lower side region R2a and a side adjacent the front upper side region R2b of the second boundary line B2, by changing the laminated structure. For example, steps in the strength of the fiber-reinforced resin can be formed along each of the boundary lines B1, B2, by setting the number of layers of the fiber-reinforced resin sheet to eight plies in the outer door handle peripheral region R1, six plies in the front lower side region R2a, and four plies in the front upper side region R2b. The number of layers in each region is not limited to the foregoing; for example, in the case of a door for an automobile, the number of layers may be set to 6-8 plies (thickness of 1.98-2.64 mm) in the outer door handle peripheral region R1, and to 4-6 plies (thickness of 1.32-1.98 mm) in the front lower side region R2a and the front upper side region R2b. The basis weight of each sheet is preferably 50-800 $g/m^2$, more preferably 100-600 $g/m^2$, and even more preferably 150-400 $g/m^2$.

The action and effects of the first embodiment will be described below.

According to the door structure of the present embodiment, since a first attenuated portion F1 is provided along a first boundary line B1 that divides the outer door panel 5 into an outer door handle peripheral region R1 and the other front side region R2, if a crack occurs in the outer door panel 5 at the time of a side collision, the crack is made to occur along the first boundary line B1, and it becomes easier to cause the outer door handle peripheral region R1 to separate from the other front side region R2. Thus, since it is possible to prevent the outer door handle peripheral region R1 from being dragged and moved by deformation of the entire outer door panel 5, it becomes possible to prevent the movement of the wire 12 in an unintended direction. Specifically, for example, it becomes possible to prevent the amount of movement of the wire 12, and to control the movement direction to a desired direction. Additionally, since it is possible to control the deformation of the entire outer door panel 5 by inducing a crack along the first boundary line B1 at the time of a side collision, it becomes possible to prevent the wire 12 from being cut by the deformed outer door panel 5. Thus, it is possible more reliably to prevent the door 1 from opening at the time of a side collision. Furthermore, since the prevention of the opening of the door can be realized without adding a reinforcing member to the lock attachment portion L, the hinge attachment portion H, the peripheral portion of the outer door handle 6, and the like, it is possible to prevent an increase in the weight and the parts count.

Separation of the two regions of the outer door panel 5 in the present Specification (for example, separation of the outer door handle peripheral region R1 and the front side region R2) means an occurrence of cross-sectional defects, cracks, gaps, etc., which reduce the maximum force that can be transmitted between the regions (tensile force, compressive force, shear force, etc.). Therefore, said separation includes not only cases in which the two regions are completely separated, but also a state in which the two regions are partially connected such that one will not drag the other.

Furthermore, according to the present embodiment, the door lock device 11 and the wire 12 are disposed on the same inner side of the outer door handle peripheral region R1 as the outer door handle 6, and are directly or indirectly supported or fixed to the outer door handle peripheral region R1. Thus, even if a crack occurs in the outer door panel 5 at the time of a side collision, since the door lock device 11 and the wire 12 are fixed to the same outer door handle peripheral region R1 as the outer door handle 6, a relative movement therebetween is not likely to occur. Thus, movement of the wire 12 for operating the door lock device 11 in the unlocking direction is more reliably prevented.

In addition, according to the present embodiment, a second attenuated portion F2 is provided along at least one second boundary line B2, which extends from a point on the first boundary line B1 and divides the front side region R2 into a plurality of regions. Thus, since it is possible to control the deformation of the entire outer door panel 5 by inducing a crack along the second boundary line B2 at the time of a side collision, it becomes easier to carry out a control such that the outer door handle peripheral region R1 is not dragged by the deformation of the entire outer door panel 5.

Furthermore, according to the present embodiment, since the first attenuated portion F1 and the second attenuated portion F2 are connected at the intersection M of the first boundary line B1 and the second boundary line B2, it is possible to induce a crack in the outer door panel 5 starting at the connection point of the first attenuated portion F1 and the second attenuated portion F2. It is possible to control the deformation of the entire outer door panel 5 by arranging the connection point in a location where stress is concentrated by the collision load at the time of a side collision.

Additionally, in the present embodiment, the second boundary line B2 is linear, and the first boundary line B1 has a broken line shape comprising two or more line segments that are connected at the intersection M with the second boundary line B2. Thus, since all or part of each attenuated portion becomes linear, it is possible to promote a progression of the crack that occurs along each boundary line. Thus, it is possible to control the deformation of the entire outer door panel 5.

Furthermore, in the present embodiment, since the end portion of the first attenuated portion F1 extends to the peripheral portion of the outer door panel 5, the outer door handle peripheral region R1 can be more easily separated from the other front side region R2 at the time of a side collision. In addition, in the present embodiment, since the first attenuated portion F1 is provided continuously along the first boundary line B1, the outer door handle peripheral region R1 can be even more easily separated from the front side region R2 at the time of a side collision.

In addition, in the present embodiment, since the first attenuated portion F1 is configured by varying the strength of the outer door panel 5 between the front side region R2 side and the outer door handle peripheral region R1 side of the first boundary line B1, it is possible to set the strength of each region R1, R2 individually, and to induce a crack along the first boundary line B1. In particular, since the first attenuated portion F1 is configured by varying the number of layers of the fiber-reinforced resin sheets between the front side region R2 side and the outer door handle peripheral region R1 side of the first boundary line B1, the configuration of the attenuated portion can be simplified. Additionally, in the present embodiment, the outer door handle peripheral region R1 has a greater number of layers than the front side region R2, and the outer door handle peripheral region R1 is set to have the greatest strength. Thus, cracks are less likely to occur in the outer door handle peripheral region R1, and relative movements of the wire 12, the door lock device 11, and the outer door handle 6, which are fixed to the outer door handle peripheral region R1 are even less likely to occur. Thus, movement of the wire 12 for operating the door lock device 11 in the unlocking direction is more reliably prevented.

Furthermore, according to the present embodiment, the door lock device 11 (locking device) is fastened to the rear vertical wall portion 5d (lock attachment flange), which is integrally formed at the rear end portion of the outer door panel 5, together with the rear vertical wall portion 4d of the rear end portion of the inner door panel 4. Thus, it is possible to firmly fix the rear end portion of the outer door panel 5, which is made of resin, etc., and to which hemming work or welding cannot be applied, to the rear end portion of the inner door panel 4. Thus, it is possible to more reliably prevent the outer door panel 5 from separating from the inner door panel 4 at the time of a side collision. In addition, since the rear end portion of the outer door panel 5 is firmly fixed to the vehicle body V via the rear vertical wall portion 5d, the door lock device 11, which is fastened to the rear vertical wall portion 5d, and the striker 19, which is engaged with the door lock device 11, it is possible to concentrate the collision load at the time of a side collision to the attenuated portions F1, F2 of the outer door panel 5, and to more reliably generate a crack along the boundary lines B1, B2.

Furthermore, according to the present embodiment, a door side member 14a (door hinge member) of the door hinge 14 is fastened to the front vertical wall portion 5b (hinge attachment flange), which is integrally formed at the front end portion of the outer door panel 5, together with the front vertical wall portion 4b of the front end portion of the inner door panel 4. Thus, it is possible to firmly fix the front end portion of the outer door panel 5, which is made of resin, etc., and to which hemming work or welding cannot be applied, to the front end portion of the inner door panel 4. Thus, it is possible to more reliably prevent the outer door panel 5 from separating from the inner door panel 4 at the time of a side collision. In addition, since the front end portion of the outer door panel 5 is firmly fixed to the vehicle body V via the front vertical wall portion 5b and the door hinge 14, which is fastened to the front vertical wall portion 5b, it is possible to concentrate the collision load at the time of a side collision to the attenuated portions F1, F2 of the outer door panel 5, and to more reliably generate a crack along the boundary lines B1, B2.

Figure 4A:
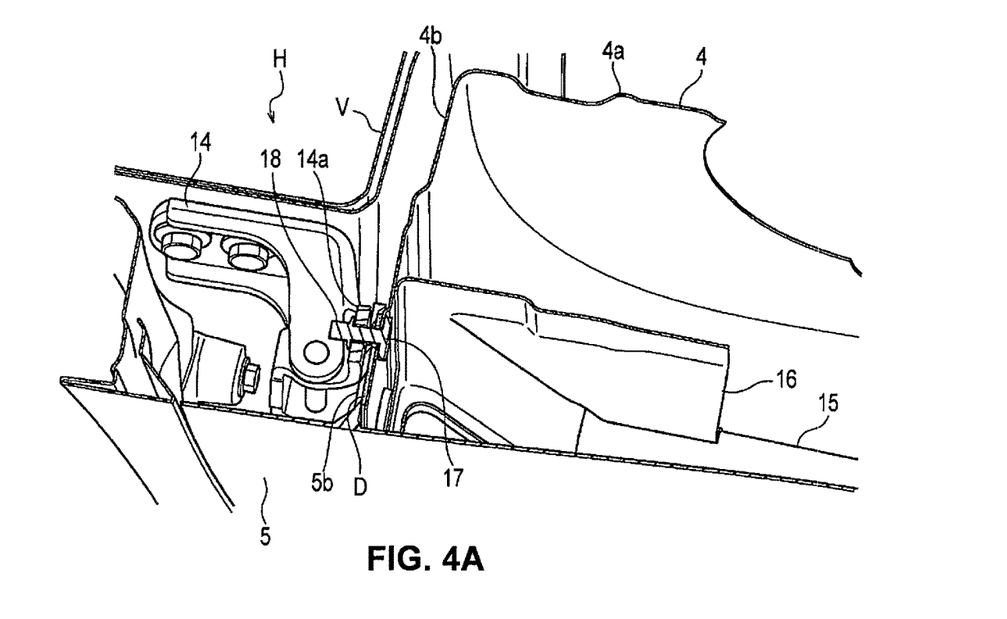
FIG. 4A is a cross-sectional perspective view illustrating a structure of a modified examples of a hinge attachment portion of the door in FIG. 1.

The structure of the joint portion of the front end portion of the inner door panel 4 and the front end portion of the outer door panel 5 is not limited to that of the first embodiment described above. In the present embodiment, the front edge portion of the front flange portion 4c of the inner door panel 4 and the front end portion of the outer door panel 5 are joined by the adhesive D, and the door hinge 14 is bolted to a portion where the front vertical wall portion 5b of the outer door panel 5 and the front vertical wall portion 4b of the inner door panel 4 are superimposed. In contrast, for example as shown in FIG. 4A, the front flange portion 4c of the inner door panel 4 may be omitted, and the front side surface of the front vertical wall portion 4b of the inner door panel 4 and the rear side surface of the front vertical wall portion 5b of the outer door panel 5 may be joined with an adhesive D, while bolting the door hinge 14 to this joint portion. The same action and effect as the above-described first embodiment can be obtained in such a modified example as well.

Figure 4B:
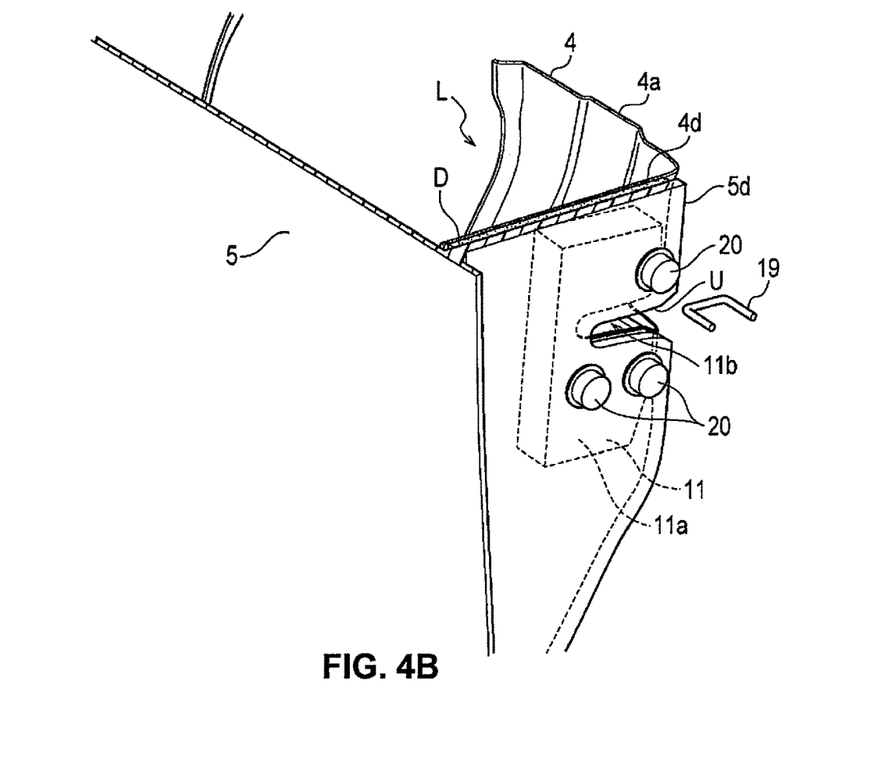
FIG. 4B is a cross-sectional perspective view illustrating a structure of the modified example of the lock attachment portion of the door in FIG. 1.

In addition, the structure of the joint portion between the rear end portion of the inner door panel 4 and the rear end portion of the outer door panel 5 is also not limited to that of the first embodiment described above. In the first embodiment, the rear edge portion of the rear flange portion 4e of the inner door panel 4 and the rear end portion of the outer door panel 5 are joined by the adhesive D, and door lock device 11 is bolted to the portion where the rear vertical wall portion 5d of the outer door panel 5 and the rear vertical wall portion 4d of the inner door panel 4 are superimposed. In contrast, for example as shown in FIG. 4B, the rear flange portion 4e of the inner door panel 4 may be omitted, and the rear side surface of the rear vertical wall portion 4d of the inner door panel 4 and the front side surface of the rear vertical wall portion 5d of the outer door panel 5 may be joined with an adhesive D, while bolting the door lock device 11 to this joint portion. The same action and effect as the above-described first embodiment can be obtained in such a modified example as well. While a bolt 17, 20 and a nut 18 were employed as fastening members, in the above-described embodiment and the modified example, screws, rivets, etc., may be employed as well.

Next, the second to the fourth embodiments of the present invention will be described. In these embodiments, the configuration of the attenuated portions in the outer door panel 5 is different from the attenuated portions F1, F2 of the first embodiment. That is, while the attenuated portions F1, F2 are formed by varying the strength of the fiber-reinforced resin that constitutes the outer door panel 5 between the two sides of the boundary lines B1, B2, the attenuated portions F1a, F1b, F1c, F2a, F2b, F2c of the second to the fourth embodiments reduce the strength of the fiber-reinforced resin on the boundary lines B1, B2 to be lower than the strengths of the regions on both sides of the boundary lines B1, B2.

Therefore, according to the attenuated portions F1a, F1b, F1c, F2a, F2b, F2c of the second to the fourth embodiments, it is possible to set the strengths of each of the regions R1, R2a, R2b to be relatively high, and to more reliably cause cracks along the boundary lines B1, B2 at the time of a side collision.

Second Embodiment

The second embodiment of the present invention will be described. The configurations that are the same as the components corresponding to the first embodiment are assigned the same reference symbols, and detailed descriptions thereof are omitted.

Figure 3B:
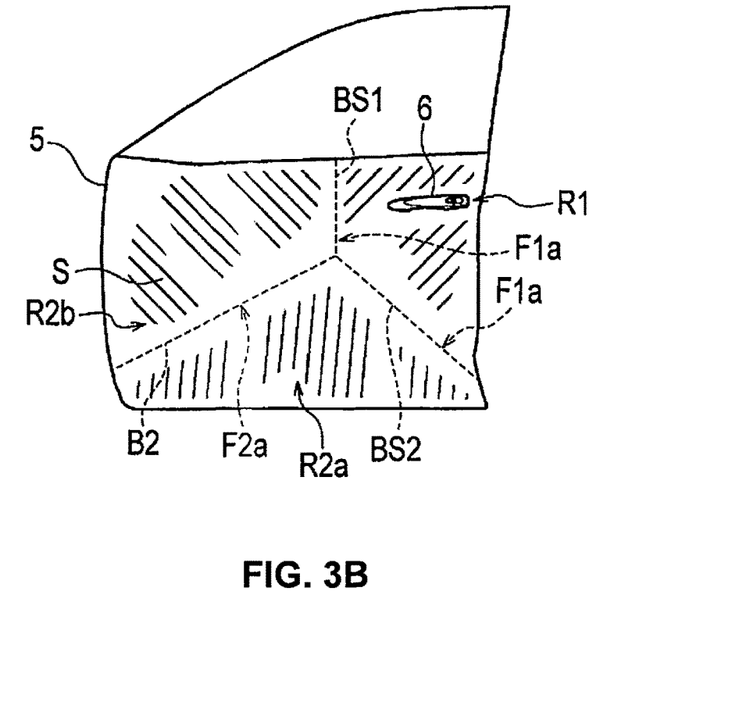
FIG. 3B is an outside view of an outer door panel according to a second embodiment.

The entire outer door panel 5 of the present embodiment is configured from a composite material laminate S, obtained by laminating a plurality of continuous fiber-reinforced resin sheets reinforced with continuous fibers, and pressurizing and curing same, as illustrated in FIG. 3B. The laminated structure of the laminate S is set to the same laminated structure in all of the regions R1, R2a, R2b. In this laminate S, the reinforcing fiber included in several layers of the layers that constitute the laminate S is cut along the boundary lines B1, B2. For example, in a laminate S configured by laminating six plies of the prepreg sheets, the reinforcing fibers contained in two of the six plies are cut at a position that crosses the first boundary line B1 or the second boundary line B2. The cutting of the reinforcing fiber can be carried out using a well-known cutting device, such as an ultrasonic cutter.

The strength of the portion of the outer door panel 5 where the reinforcing fiber is cut is reduced to be less than the portion where the reinforcing fiber is not cut. That is, the portion where the reinforcing fiber is cut along the first boundary line B1 corresponds to the first attenuated portion F1a, and the portion where the reinforcing fiber is cut along the second boundary line B2 corresponds to the second attenuated portion F2a.

Since the door structure according to the present embodiment comprises the same configuration as the door structure according to the first embodiment, the same action and effect as the first embodiment can be obtained. In addition, in the present embodiment, the attenuated portions F1a, F2a are configured by cutting at least a portion of the continuous fibers along the boundary lines B1, B2, in the outer door panel 5, which is made of fiber-reinforced resin that has continuous fibers as reinforcing fibers. According to this configuration, it is possible easily to form an attenuated portion that is lower in strength than the outer door handle peripheral region R1, the front lower side region R2a, and the front upper side region R2b.

Third Embodiment

Next, the third embodiment of the present invention will be described. The configurations that are the same as the components corresponding to the first embodiment are given the same reference symbols, and detailed descriptions thereof are omitted.

Figure 3C:
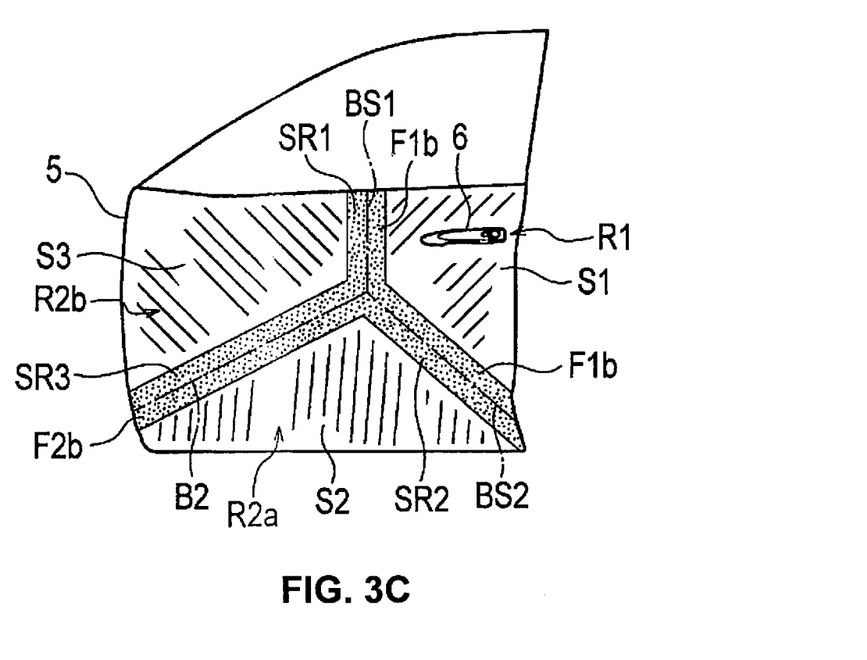
FIG. 3C is an outside view of an outer door panel according to a third embodiment.

In the present embodiment, the outer door handle peripheral region R1, the front lower side region R2a, and the front upper side region R2b, which constitute the general portion of the outer door panel 5, are respectively configured from composite material laminates S1, S2, S3, obtained by laminating a plurality of continuous fiber-reinforced resin sheets reinforced by continuous fibers, and pressurizing and curing same, as illustrated in FIG. 3C. The laminates S1, S2, S3 are not directly in contact with each other, and the peripheral portions along the boundary lines B1, B2 of the laminates S1, S2, S3 are separated from the boundary lines B1, B2. That is, the front side peripheral portion of the laminate S1 of the outer door handle peripheral region R1 is separated from the first boundary line B1. The front upper side peripheral portion of the laminate S2 of the front lower side region R2a is separated from the second boundary line B2, and the rear upper side peripheral portion is separated from the first boundary line B1. The rear lower side peripheral edge portion of the laminate S3 of the front upper side region R2b is separated from the second boundary line B2, and the rear side peripheral portion is separated from the first boundary line B1. A strip-shaped region SR1 extends along the first straight line segment BS1, sandwiched between the front side peripheral portion of the laminate S1 of the outer door handle peripheral region R1 and the rear lower side peripheral edge portion of the laminate S2 of the front upper side region R2b. A strip-shaped region SR2 extends along the second straight line segment BS2, sandwiched between the front side peripheral portion of the laminate of the outer door handle peripheral region R1 and the rear upper side peripheral edge portion of the laminate of the front lower side region R2a. A strip-shaped region SR3 extends along the second straight line segment B2, sandwiched between the front upper side peripheral edge portion of the laminate of the front lower side region R2a and the rear lower side peripheral edge portion of the laminate of the front upper side region R2b.

The strip-shaped regions SR1, SR2, SR3 of the outer door panel 5 are configured from short fiber-reinforced resin, which has a fiber volume fraction that is less than that of continuous fiber-reinforced resin, and that has a fiber material with a shorter fiber length than the fiber material of the continuous fiber-reinforced resin as the reinforcing fiber. The short fiber-reinforced resin has less strength and a lower elastic modulus than continuous fiber-reinforced resin. That is, the short fiber-reinforced resin of the strip-shaped regions SR1, SR2 along the first boundary line B1 corresponds to the first attenuated portion F1b, and the short fiber-reinforced resin of the strip-shaped region SR3 along the second boundary line B2 corresponds to the second attenuated portion F2b. The fiber volume fraction is not particularly limited, but, for example, in the case of a door for an automobile, the fiber volume fraction of the continuous fiber-reinforced resin may be set to 45-55%, and that of short fiber-reinforced resin may be set to 20-30%.

Since the door structure according to the present embodiment comprises the same configuration as the door structure according to the first embodiment, the same action and effect as the first embodiment can be obtained. In addition, in the present embodiment, the three regions R1, R2a, R2b, which constitute the general portion of an outer door panel 5, are configured from continuous fiber-reinforced resin, and the attenuated portions F1b, F2b are configured from short fiber-reinforced resin; therefore, it is possible to further increase the difference in strength between the general portion and the attenuated portion.

Fourth Embodiment

Next, the fourth embodiment of the present invention will be described. The configurations that are the same as the components corresponding to the first embodiment are assigned the same reference symbols, and detailed descriptions thereof are omitted.

Figure 3D:
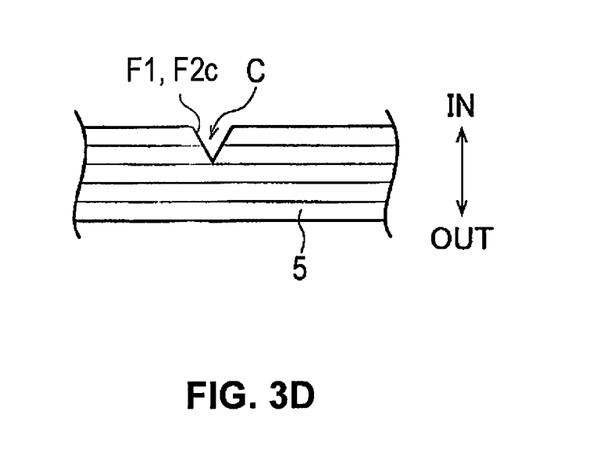
FIG. 3D is a cross-sectional view of an attenuated portion of the outer door panel according to a fourth embodiment.

FIG. 3D illustrates, according to the present embodiment, a cross section of the outer door panel 5 perpendicular to the first boundary line B1 or the second boundary line B2. In the present embodiment, V-shaped notches C are provided along the boundary lines on the surface of the outer door panel 5 on the inner door panel 4 side in order to reduce the strength of said portion, as illustrated in FIG. 3D. That is, the notch C along the first boundary line B1 corresponds to the first attenuated portion F1c, and the notch C along the second boundary line B2 corresponds to the second attenuated portion F2c. The notches C may be formed, for example, by press molding with a metal mold provided with a V-shaped protrusion in cross section on the molding surface. Alternatively, the notches may be formed by cutting using a tool, such as an end mill, on the inner door panel 4 side surface of the outer door panel 5 after molding.

Since the door structure according to the present embodiment comprises the same configuration as the door structure according to the first embodiment, the same action and effect as the first embodiment can be obtained. In addition, according to the present embodiment, it is possible to easily form attenuated portions F1c, F2c that are lower in strength than the outer door handle peripheral region R1, the front lower side region R2a, and the front upper side region R2b, by providing the notch C described above.

Embodiments of the present invention were described above; however, these embodiments are simply examples described in order to facilitate understanding of the present invention, and the present invention is not limited to the embodiments. The technical scope of the present invention is not limited to the specific technical matters disclosed in the above-described embodiment, and includes various modifications, changes, and alternative techniques that can be easily derived therefrom.

For example, a combination of two or more of the above-described embodiments and modified examples falls within the scope of the present invention. For example, the first embodiment and the second embodiment may be combined. Specifically, the laminated structure of the fiber-reinforced resin sheets of the regions R1, R2a, R2b may be made different from each other, and the reinforcing fibers contained in several layers along the boundary lines B1, B2 between the regions R1, R2a, R2b may be cut. In addition, for example, the first embodiment and the third embodiment may be combined. Specifically, the laminates S1, S2, S3 of the regions R1, R2a, R2b may be configured from laminates whose laminated structures of the fiber-reinforced resin sheets are different from each other, and strip-shaped regions SR1, SR2, SR3 may be formed between the laminates to configure the strip-shaped regions SR1, SR2, SR3 from the short fiber-reinforced resin described above. Additionally, the notches C of the fourth embodiment may be combined and applied to any one of the first to the third embodiments, or to a combination of two or more.

In addition, it is possible also to use one of the above-described embodiments or a combination of two or more thereof together with one outer door panel 5. For example, a combination of the third and fourth embodiments may be used in an attenuated portion along the first straight line segment BS1, a combination of the second and fourth embodiments may be used in an attenuated portion along the second straight line segment BS2, and a combination of the first and second embodiments may be used in an attenuated portion along the second boundary line B2.

Furthermore, in the above-described embodiments, the boundary lines B1, B2 and the attenuated portions F1, F1a, F1b, F1c, F2, F2a, F2b, F2c are disposed in a pattern in which three straight line segments extend radially from one point on the outer door panel 5, but the arrangement pattern (shape, number, etc.) of the boundary lines B1, B2 and the attenuated portions F1, F1a, F1b, F1c, F2, F2a, F2b, F2c is not limited thereto. For example, a plurality of second boundary lines B2 may extend from one point on the first boundary line B1, and an attenuated portion may be provided along each thereof. Additionally, one or more may extend from a plurality of points on the first boundary line B1, and an attenuated portion may be provided along each thereof. Furthermore, one or more third boundary lines may branch and extend from a point on the second boundary line B2, and an attenuated portion may be provided along each thereof. The number of branches of the boundary lines and attenuated portions is not limited, and it goes without saying that a fourth and a greater number of boundary lines and attenuated portions may be provided. Additionally, the second attenuated portions F2, F2a, F2b, F2c along the second boundary line B2 may be omitted, and only the first attenuated portions F1, F1a, F1b, F1c along the first boundary line B1 may be provided. The attenuated portions need not extend to the peripheral edge portion of the outer door panel 5, or may be intermittently extended as well. One or more of the boundary lines and attenuated portions that extent therealong may be curved as well. The attenuated portions may also be separated from each other.

Additionally, in the above-described embodiments, an example was shown in which a prepreg sheet, in which thermosetting resin is impregnated into carbon fibers aligned in one direction, is used as the material for the outer door panel 5 made of fiber reinforced thermosetting resin, but the material of the outer door panel 5 is not limited thereto. Other than carbon fiber, examples of reinforcing fiber that can be used include glass fiber, polyalamide fiber, alumina fiber, silicon carbide fiber, boron fiber, and carborundum fiber. In addition, for example, polyacrylonitrile (PAN type), pitch type, cellulose type, vapor grown carbon fiber by hydrocarbon, graphite fiber, and the like, may be used as the carbon fiber. Two or more types of these fibers may also be used in combination. Additionally, other than continuous reinforcing fibers, the reinforcing fiber may be in the form of discontinuous reinforcing fibers, long fibers, short fibers, or a combination thereof, or reinforcing fibers of a woven fabric. Well-known thermosetting resin and thermoplastic resin may be used as the matrix resin. Specific examples include epoxy resin, phenol resin, unsaturated polyester resin, vinyl ester resin, polycarbonate resin, polyester resin, polyamide (PA) resin, polypropylene (PP) resin, liquid crystal polymer resin, polyethersulfone resin, polyether ether ketone resin, polyarylate resin, polyphenylene ether resin, polyphenylene sulfide (PPS) resin, polyacetal resin, polysulfone resin, polyimide resin, polyetherimide resin, polyolefin resin, polystyrene resin, modified polystyrene resin, AS resin (copolymer of acrylonitrile and styrene), ABS resin (copolymer of acrylonitrile, butadiene and styrene), modified ABS resin, MBS resin (copolymer of methyl methacrylate, butadiene and styrene), modified MBS resin, polymethyl methacrylate (PMMA) resin, modified polymethyl methacrylate resin, and the like.

Additionally, while the outer door panel 5 of the above-described embodiment is made of fiber-reinforced resin, all or part of the outer door panel 5 may be configured from resin which does not include reinforcing fiber (for example ABS resin, PC/ABC resin, PP resin, PA resin, or the like). In the outer door panel 5 made of resin, attenuated portions may be configured from a stepped strength portion in which the material and the thickness are varied between the regions on both sides of a boundary line, or by a notch, etc., formed along the boundary lines.

Furthermore, while the inner door panel 4 is made of a steel plate in the embodiment described above, the material of the inner door panel 4 may be other metals such as an aluminum alloy, a fiber-reinforced resin, or a resin that does not contain reinforcing fiber.

The method of molding the outer door panel 5 is not particularly limited, and well-known molding methods such as the hot press molding method and the autoclave molding method may be used. Alternatively, the outer door panel may be molded using a method in which a fiber preform as a base material is sealed in a metal mold and a matrix resin is injected under pressure into the metal mold (resin transfer molding method). As long as the outer door panel 5 is made of resin or fiber-reinforced resin reinforced with discontinuous fibers (short fibers, long fibers), the outer door panel may be molded using the injection molding method, or the like.

The present invention can be applied to a vehicle door having an outer door panel made of resin, etc.

The invention claimed is:

1. A vehicle door structure comprising:
an inner door panel;
an outer door panel made of resin;

an outer door handle attached to the outer door panel; and a first attenuated portion being provided to the outer door panel along a first boundary line that substantially entirely divides the outer door panel into a first region that includes the outer door handle and a second region, and the first boundary line being positioned on a front side of a front end of the outer door handle, and the first boundary line including a first line segment that extends in a vertical direction, and a second line segment that extends rearward and obliquely downward from a lower end point of the first line segment, a second attenuated portion being provided extending from a lower end point on the first boundary line along at least one second boundary line that divides the second region into a plurality of regions.

2. The vehicle door structure according to claim 1, further comprising a door lock device, and a wire connected to the outer door handle for operation of the door lock device, the door lock device and the wire are disposed on an inner side of the first region as viewed from a side surface direction with respect to the outer door panel and supported to the first region.

3. The vehicle door structure according to claim 1, wherein the first attenuated portion and the second attenuated portion are connected at an intersection of the first boundary line and the second boundary line.

4. The vehicle door structure according to claim 1, wherein the second boundary line is linear, and the first line segment and the second line segment are connected at an intersection with the second boundary line.

5. The vehicle door structure according to claim 1, wherein an end portion of the first attenuated portion extends to a peripheral edge portion of the outer door panel.

6. The vehicle door structure according to claim 1, wherein the first attenuated portion is provided continuously along the first boundary line.

7. The vehicle door structure according to claim 1, wherein a strength of the resin constituting the outer door panel in the first attenuated portion is varied between a first region side and a second region side of the first boundary line.

8. The vehicle door structure according to claim 7, wherein the outer door panel is made of laminated fiber-reinforced resin sheets, and the number of layers of the fiber-reinforced resin sheets in the first attenuated portion is varied between a side adjacent the first region and a side adjacent the second region of the first boundary line.

9. The vehicle door structure according to claim 1, wherein a strength of the resin constituting the outer door panel in the first attenuated portion is set to be less than the first region and the second region.

10. The vehicle door structure according to claim 9, wherein the outer door panel includes a continuous fiber-reinforced resin having continuous fibers as reinforcing fibers, and at least a portion of continuous fibers in the first attenuated portion are cut along the first boundary line.

11. The vehicle door structure according to claim 9, wherein at least the first region of the outer door panel is configured from a continuous fiber-reinforced resin having continuous fibers as reinforcing fibers, and short fiber-reinforced resin, which has a fiber volume fraction that is less than that of the continuous fiber-reinforced resin and that has shorter fibers as reinforcing fibers, is disposed in the first attenuated portion.

12. The vehicle door structure according to claim 1, wherein the first attenuated portion includes a notch that is provided on an inner door panel side surface of the outer door panel.

13. The vehicle door structure according to claim 1, further comprising a lock attachment flange integrally formed at an end portion of the outer door panel and extending to an inner door panel side, and a locking device fastened to the lock attachment flange together with an end portion of the inner door panel.

14. The vehicle door structure according to claim 1, further comprising a hinge attachment flange integrally formed at an end portion of the outer door panel and extending to an inner door panel side, and a door hinge member is fastened to the hinge attachment flange together with an end portion of the inner door panel.

* * * * *